United States Patent
Yumii et al.

(10) Patent No.: US 6,984,815 B2
(45) Date of Patent: Jan. 10, 2006

(54) ELECTRONIC PULSE DETECTION APPARATUS AND ELECTRONIC PULSE DETECTION CHIP

(75) Inventors: Takayoshi Yumii, Tamano (JP); Kyoji Doi, Tamano (JP); Noriaki Kimura, Tamano (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 28 days.

(21) Appl. No.: 10/489,422

(22) PCT Filed: Sep. 26, 2002

(86) PCT No.: PCT/JP02/09978
§ 371 (c)(1),
(2), (4) Date: Apr. 28, 2004

(87) PCT Pub. No.: WO03/029767
PCT Pub. Date: Apr. 10, 2003

(65) Prior Publication Data
US 2005/0072898 A1 Apr. 7, 2005

(30) Foreign Application Priority Data
Sep. 27, 2001 (JP) ............................. 2001-296036

(51) Int. Cl.
H01J 40/14 (2006.01)

(52) U.S. Cl. .................... 250/214 LS; 250/214 VT; 250/370.09; 313/529

(58) Field of Classification Search ......... 250/214 VT, 250/214 LS, 214 R, 208.2, 370.09; 313/529
See application file for complete search history.

(56) References Cited

U.S. PATENT DOCUMENTS 5,250,795 A * 10/1993 Koishi et al. ......... 250/214 VT

FOREIGN PATENT DOCUMENTS

| JP | A 59-56181 | 3/1984 |
| JP | A 60-187878 | 9/1985 |
| JP | A 5-211321 | 8/1993 |
| JP | A 10-290015 | 10/1998 |
| JP | A 2000-58808 | 2/2000 |

* cited by examiner

Primary Examiner—Kevin Pyo
(74) Attorney, Agent, or Firm—Oliff & Berridge, PLC (57) ABSTRACT

An electronic pulse detection device includes: an MCP in which a plurality of capillaries configured to increase the number of electrons are arranged in matrix; and an electronic pulse reading chip 30 disposed on an output side of the MCP. The electronic pulse detection chip 30 includes anodes 32 and detection transistors 34 both provided so as to correspond to the respective capillaries. Electronic pulses are incident on the anodes 32 from the MCP. Drains of the detection transistors 34 are connected to the corresponding anodes. The detection transistors 34 on the same row are connected to one another at gates thereof and turned on/off as a unit, and sources of the detection transistors 34 on the same column are connected to a corresponding switch circuit 80 as a unit to be connected to a current-voltage conversion resistance $R_L$ via the switch circuit 80. The current-voltage conversion resistance $R_L$ converts a current, which flows therethrough when the electronic pulses are incident on the anodes 32, to a voltage and inputs the voltage to an operational amplifier 90. This makes it possible to detect feeble light and radiation ray two dimensionally.

3 Claims, 8 Drawing Sheets

ELECTRONIC PULSE DETECTION APPARATUS AND ELECTRONIC PULSE DETECTION CHIP

TECHNICAL FIELD

The present invention relates to an electronic pulse detection device and an electronic pulse detection chip, and more particularly, to an electronic pulse detection device and an electronic pulse detection chip suitable for detecting a two-dimensional electronic pulse obtained by photoelectrically converting extremely feeble light.

BACKGROUND ART

It will be useful if high-precision and high-speed detection of extremely feeble light and radiation is made possible. For example, it is under study to make use of a so-called DNA chip, on which part of genes are arranged in large number, for disease treatment and prevention by a method of combining (hybridization) genes in an analyte collected from a human body and having a fluorescent material added thereto and the genes on the DNA chip, thereby examining which one of the genes on the DNA chip is hybridized. The hybridized gene on the DNA chip is specified by the detection of fluorescence originating from the fluorescent material added in the analyte.

Further, if a so-called reflected X-ray imaging device that detects a backscattered X-ray emitted to a substance to convert it to an image can be realized, nondestructive inspection using an X-ray can be conducted easily on a surface portion of a large structure such as wings of an airplane, and an inspection device can be downsized.

Moreover, if a night vision camera with enhanced sensitivity can be produced, various observations which have been difficult due to the influence of light and observation of the influence of light and so on can be easily conducted.

Conventionally, in detecting feeble light, after light (photons) is converted to electrons, the electrons are amplified by a secondary electron multiplier such as a photomultiplier tube to be detected. Further, a feeble radiation ray such as an X-ray or a γ ray has been detected in such a manner that the radiation ray is made incident on a scintillator to be converted to light and this light is further converted to electrons by a photomultiplier tube or the like.

Further, in detecting feeble light two dimensionally, a device called a microchannel plate is available. This is configured such that several millions of very thin glass capillaries each being about 6 μm to about 25 μm in diameter and about 0.24 mm to about 1.0 mm in length are bundled and finished in a thin plate shape, and each of the capillaries (channels) arranged in a thickness direction functions as an independent secondary electron multiplier and the entire unit of the capillaries form a secondary electron multiplier. This microchannel plate (hereinafter, referred to as an MCP) has a high-speed property, and a high-gain property, and exhibits an excellent pulse-height distribution property according to the intensity of light to have a two-dimensional detecting function.

When this MCP is utilized, a photoelectric surface is disposed on a light incident part and photons are converted to electrons, which are then made incident on the capillaries of the MCP. The electrons incident on the capillaries are accelerated by a direct-current voltage of about 2000 V applied on both sides of the capillaries and collide with tube walls of the capillaries, so that the number thereof is increased about $10^4$ to $10^{12}$ times. The performance of a device using the MCP is determined by how an electronic pulse group thus amplified and outputted is read.

Conventionally, in order to read electronic pulses (electrons whose number is increased) outputted from an MCP, a typical method is such that a fluorescent surface is disposed on an output side of the MCP, and after the electron pulses are once converted to light, this light is photographed by a CCD camera.

However, in the above-mentioned conventional method of converting electronic pulses amplified by the MCP to light and photographing this light by the CCD camera, it is practically difficult to detect extremely feeble light such as fluorescence emitted by a DNA chip and a feeble radiation such as a backscattered X-ray since electrons are scarcely incident on the capillaries of the MCP and a pulse width of the electronic pulses outputted from the MCP is extremely short such as less than nanoseconds and therefore, a noise signal is larger than a detection signal.

The present invention is made in order to solve the above-mentioned drawbacks of the prior art, and an object thereof is to enable the two-dimensional detection of feeble light and radiation ray.

DISCLOSURE OF THE INVENTION

In order to achieve the object stated above, an electronic pulse detection device according to the present invention is characterized in that it includes: a plurality of electron amplifying parts arranged in matrix and configured to increase the number of incident electrons; electrode parts which are provided to correspond to the respective plural electron amplifying parts and on which the electrons from the electron amplifying parts are incident; a plurality of switch parts provided to correspond to the respective electrode parts, the switch parts on a same row and on a same column being connected to one another, and the mutually connected switch parts on the same row or on the same column being turned on/off as a unit; a current-voltage converting part to which the switch parts are connected and which is configured to convert a current due to the electrons incident on the electrode parts to a voltage when the switch parts are turned on; and a plurality of switch circuit parts each provided to each row or each column of the switch parts connected to one another, and each configured, when turned on, to connect the switch parts of the same row or the same column to the current-voltage converting part as a unit and when turned off, to ground the switch parts of the same row or the same column as a unit.

Preferably, the switch parts and the plural switch circuits are connected to an operation switchover part configured to turn on/off each row or each column of the switch parts that are turned on/off simultaneously and the switch circuits based on a quadrature modulation pattern.

An electronic pulse detection chip according to the present invention is characterized in that it includes: a plurality of detection electrodes which are arranged in matrix on an upper face and on which electronic pulses are incident; a plurality of field effect transistors provided under the detection electrodes via an insulation layer so as to correspond to the respective detection electrodes; conductive parts electrically connecting drains or sources of the field effect transistors to the detection electrodes; gate control lines each connecting gates of the field effect transistors on a same row or on a same column to one another; signal reading lines each connecting sources or drains, to which the detection electrodes are not connected, of the field effect transistors on the same row or the same column to one another; switch circuits provided to correspond to the respective signal reading lines; and a current-voltage conversion circuit to which the signal reading lines are connected in parallel via the switch circuits.

In the present invention as configured above, the switch parts arranged in matrix are operated based on, for example, the quadrature modulation patterns, the switch parts on the same row or the same column being operated as a unit, so that it is possible to simultaneously convert the electronic pulses incident on the plural electrode parts to voltages to read them, and by the demodulation thereof, a two-dimensional image can be easily obtained. The quadrature modulation patterns are preferably patterns based on a Hadamard matrix.

The electronic pulse detection chip according to the present invention can be formed easily by a manufacturing technology of VLSI (Very Large Scale Integrated circuit), and enables downsizing and a high-speed operation of the electronic pulse detection device.

BRIEF DESCRIPTION OF DRAWINGS

FIG. 3-A is a cross-sectional view schematically showing a detection transistor according to the embodiment of the present invention in detail;

FIG. 3-B is a plane view schematically showing the detection transistor according to the embodiment of the present invention in detail;

FIG. 6-A is an explanatory view of a circuit operation according to the embodiment of the present invention when the detection transistor is ON and a switch circuit is ON;

FIG. 6-B is an explanatory view of a circuit operation according to the embodiment of the present invention when the detection transistor is OFF and the switch circuit is ON;

FIG. 6-C is an explanatory view of a circuit operation according to the embodiment of the present invention when the detection transistor is ON and the switch circuit is OFF;

FIG. 8-A is a view explaining pulse addition by the electronic pulse detection chip according to the embodiment of the present invention and is an explanatory view when an electronic pulse is incident on an anode 32b; and FIG. 8-B is a view explaining the pulse addition by the electronic pulse detection chip according to the embodiment of the present invention, and is an explanatory view when the electronic pulse is incident on the anode 32b and a current due to the electronic pulses is reflected.

BEST MODE FOR CARRYING OUT THE INVENTION

A preferred embodiment of an electronic pulse detection device according to the present invention will be explained in detail based on the attached drawings.

Figure 2:
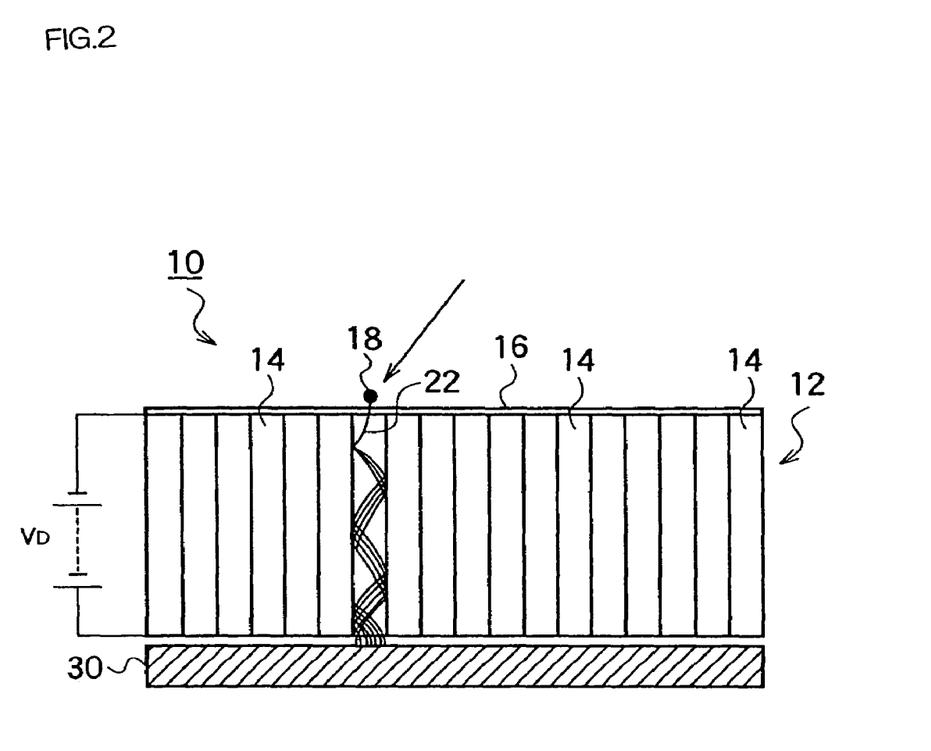
FIG. 2 is a cross-sectional view showing the schematic configuration of an electronic detection device of the embodiment of the present invention.

FIG. 2 is a schematic explanatory view of an electronic pulse detection device according to an embodiment of the present invention. An electronic pulse detection device 10 of this embodiment has a microchannel plate (MCP) 12. The MCP 12 is constituted such that a large number of glass capillaries 14 each being about 6 $\mu$m to about 25 $\mu$m in diameter and about 0.24 mm to about 1.0 mm in length are bundled to be formed in a plate shape as described previously. In this embodiment, the MCP 12 is constituted such that, for example, 256×256 pieces of capillaries 14 with a diameter of about 6 $\mu$m are arranged tightly close to one another to be integrated.

The electronic pulse detection device 10 has a photoelectric surface 16 provided on an upper portion of the MCP 12, namely, on a light incident side thereof, where feeble light (photons) 18 is converted to electrons to be incident on the MCP 12. Further, the capillaries 14 constituting the MCP 12 are structured such that upper end sides thereof facing the photoelectric surface 16 are connected to a minus side of a direct-current power source $V_D$ via a not-shown electrode and opposite lower end sides thereof are connected to a plus side of the direct-current power source $V_D$ via an electrode, so that the number of electrons 22 that have been incident from the photoelectric surface 16 can be increased about $10^4$ to about $10^{12}$ times.

Figure 1:
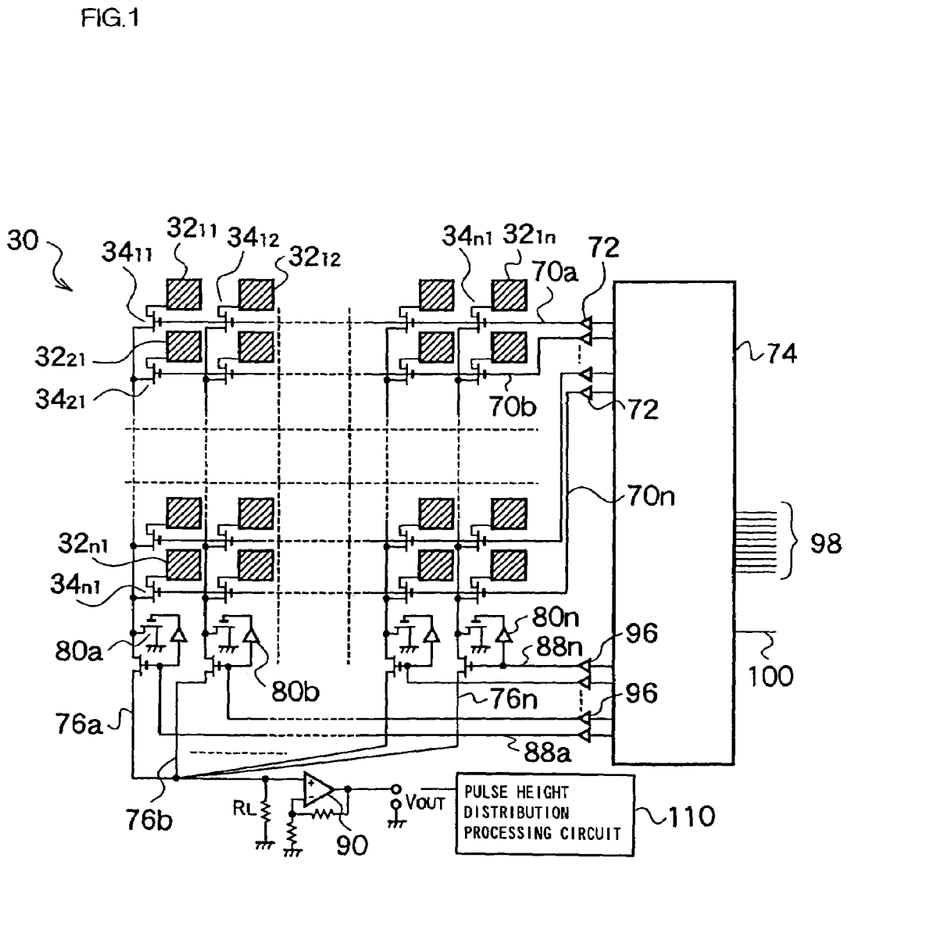
FIG. 1 is a detailed explanatory view of an electronic pulse detection chip according to an embodiment of the present invention.
Figure 3:
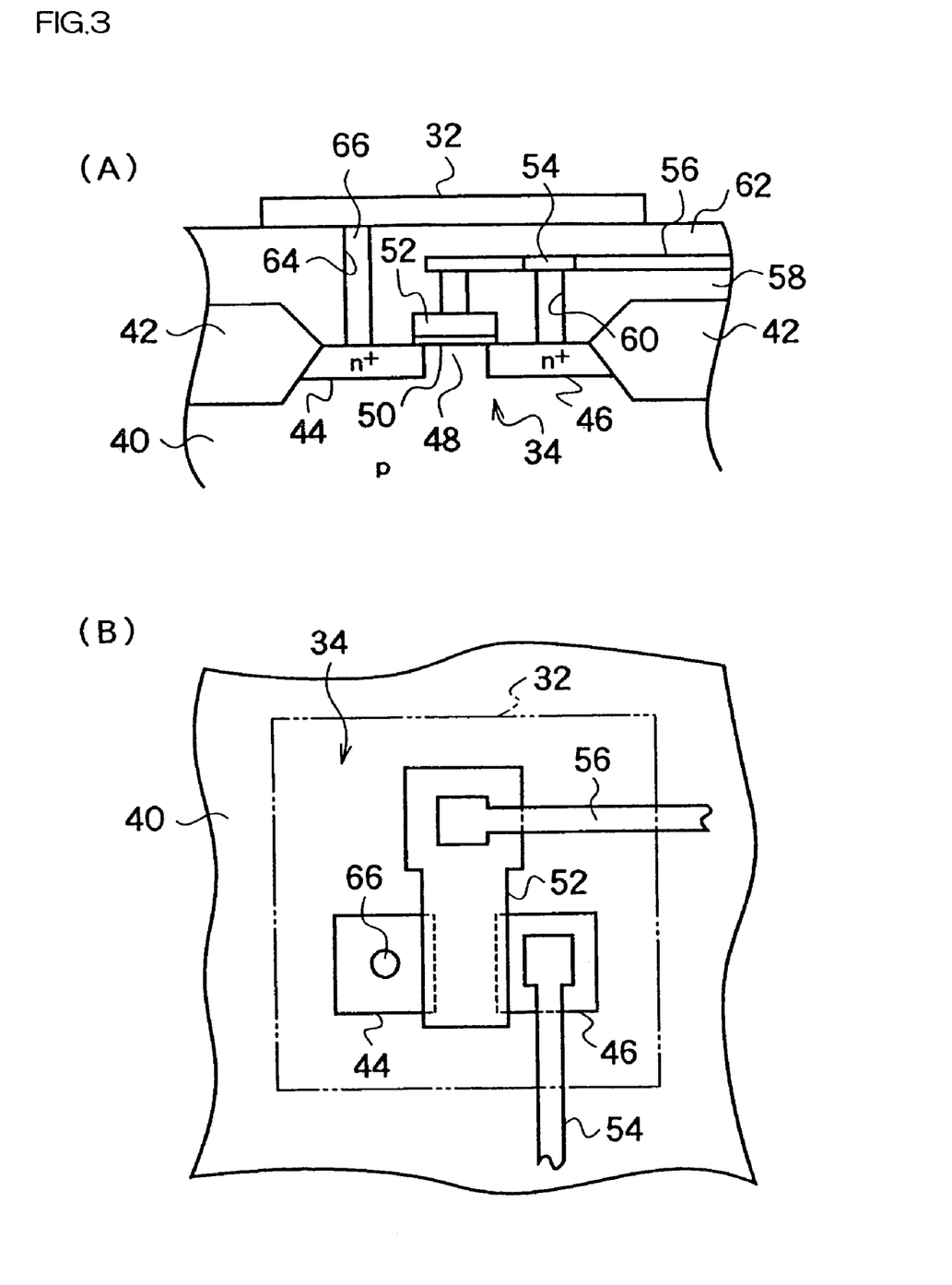

An electronic pulse reading chip 30 is disposed on a bottom portion of the MCP 12. This electronic pulse reading chip 30, which has a structure as shown in FIG. 1, includes a plurality of anodes 32 ($32_{ij}$: i=1, 2, 3, ... n, j=1, 2, 3 .... n) being detection electrodes (electrode parts) made of metal such as aluminum (Al). These anodes 32 are provided to correspond the respective capillaries 14 of the MCP 12 and are arranged in matrix. The dimension of each of the anodes 32 corresponds to the diameter of each of the capillaries 14, and is set to about 6 $\mu$m×6 $\mu$m in the embodiment. Further, the anodes 32 are connected to detection transistors 34 ($34_{ij}$: 1, 2, 3, ... n, j=1, 2, 3 ..., n) being switch parts provided to correspond to the respective anodes 32. In the embodiment, the detection transistors 34 are n-channel MOSFETs, and formed under the anodes (detection electrodes) 32 with an insulation layer interposed therebetween as shown in FIG. 3-A and FIG. 3-B.

Specifically, on an upper portion of a p-conductive semiconductor substrate 40, element isolation regions 42 formed by a LOCOS method or the like demarcate a plurality of element forming regions in matrix, and the detection transistors 34 are provided in the element forming regions. Each of the detection transistors 34 has a source region 44 and a drain region 46 that are formed of an $n^+$ diffusion layer having diffused n-conductive type impurities. An area between the source region 44 and the drain region 46 is a channel region 48.

On an upper portion of each of the channel regions 48, a gate oxide film 50 made of a silicon dioxide film (silicon oxide film) or the like is provided. A gate electrode 52 made of metal such as Al, polycrystalline silicon, or the like is formed on the gate oxide film 50. A signal output wiring 54 and a gate input wiring 56 are disposed above the drain region 46 and the gate electrode 52. These signal output wiring 54 and gate input wiring 56 are electrically connected to the drain region 46 and the gate electrode 52 via through holes 60 formed in an insulation layer 58 formed of a silicon oxide film or the like and covering the drain region 46 and the gate electrode 52.

Further, the signal output wiring 54 and the gate input wiring 56 are covered with an upper insulation layer 62 made of a silicon oxide film or the like. On the upper insulation layer 62, the anode 32 being a detection electrode is formed. The anode 32 is electrically connected to the source region 44. Specifically, a via hole 64 is formed to pass through the insulation layer 58 and the upper insulation layer 62 that cover the source region 44, and a plug (conductive part) 66 made of a conductive material such as Al or copper (Cu) is filled in the via hole 64 so that the source region 44 and the anode 32 are electrically connected via the plug 66.

The detection transistors 34 arranged in matrix are configured such that gates of the detection transistors 34 constituting each row are connected to one another as shown in FIG. 1 so that these detection transistors 34 are turned on/off simultaneously. Specifically, the gate input wirings 56 are connected to gate control lines 70 (70a, 70b, . . . 70n) provided to correspond to the respective rows, and a gate voltage for simultaneously turning on the detection transistors 34 on the same row is inputted to the detection transistors 34 disposed on the same row via each of the gate control lines 70. These gate control lines 70 are connected via buffers 72 to an operation switchover part 74, detailed functions of which will be later described.

The detection transistors 34 arranged in matrix are configured such that sources of the detection transistors 34 constituting each column are connected to one another. Specifically, the signal output wirings 54 electrically connected to the drain regions 46 of the detection transistors 34 disposed on the same column are connected to corresponding one of signal reading lines 76 (76a, 76b, . . . 76n) provided to correspond to the respective columns. These signal reading lines 76 are connected to a current-voltage conversion resistance $R_L$ being a current-voltage converting part via corresponding switch circuits 80 (80a, 80b, . . . 80n). The current-voltage conversion resistance $R_L$ has a resistance value sufficiently smaller than that on a switch circuit 80 side to prevent the reflection of a current pulse signal being an incident signal.

Figure 6:
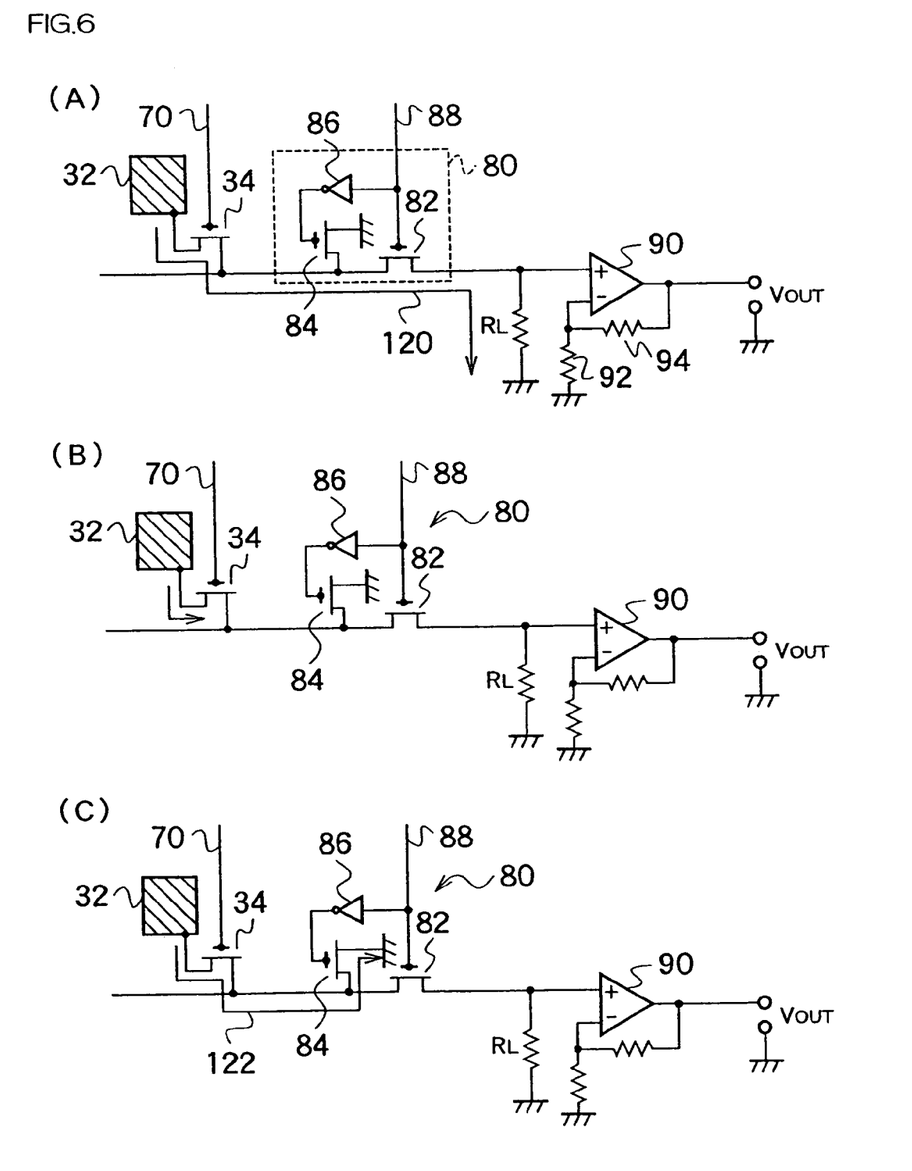

Each of the switch circuits 80 is constituted of a pair of enhancement-type nMOS transistors (transistors) 82, 84 and an inverter 86 as is shown in detail in FIG. 6-A to FIG. 6-C in the embodiment. A gate of the first transistor 82 is connected to a corresponding one of second gate control lines 88 (88a, 88b, . . . 88n) provided to correspond to respective columns. Further, a gate of the other second transistor 84 is connected to the second gate control line 88 via the inverter 86. A drain of the second transistor 84 is grounded and a source thereof is connected to the source of the first transistor 82 via the signal reading line 76. A drain of the first transistor 82 is connected to the current-voltage conversion resistance $R_L$ via the signal reading line 76.

The signal reading line 76 and a noninverting input terminal of an operational amplifier 90 being an amplifier are connected to one end of the current-voltage conversion resistance $R_L$. The other end of the current-voltage conversion resistance $R_L$ is grounded. Further, the inverting input terminal of the operational amplifier 90 is grounded via a resistance 92 and connected to an output side of the operational amplifier 90 via a feedback resistance 94. An output of the operational amplifier 90 is inputted via an output terminal to a pulse height distribution processing circuit 110 provided outside the electronic pulse reading chip 30 to be converted to two-dimensional image data by a not-shown image generating part.

Note that the second gate control lines 88 to which the switch circuits 80 are connected are connected to the operation switchover part 74 via the buffers 96 as shown in FIG. 1. The operation switchover part 74 has an encoder for Hadamard logic generation, and connected thereto are a plurality of state number input terminals 98 for generating operation patterns corresponding to the Hadamard matrix and an enable input terminal 100.

Figure 4:
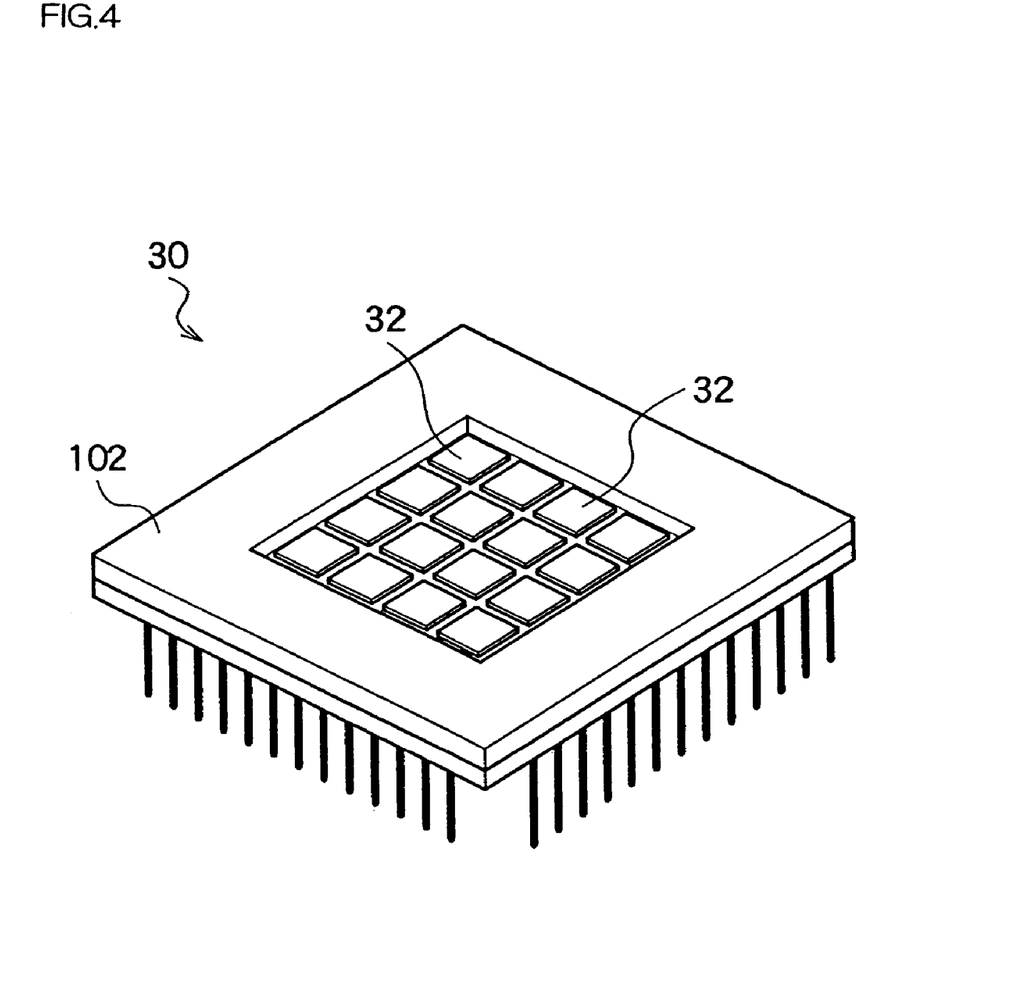
FIG. 4 is a perspective view of the electronic pulse detection chip according to the embodiment of the present invention.

The electronic pulse reading chip 30 is formed through the use of a generally known manufacturing technology for forming a VLSI being a semiconductor device. Then, the electronic pulse reading chip 30 is disposed on an upper portion of a package 102 in a state in which the anodes 32 arranged in matrix are exposed as shown in FIG. 4 or in a state in which the anodes 32 are covered with a protective member capable of passing electrons.

In the electronic pulse detection device 10 of the embodiment as configured above, the photoelectric surface 16 thereof converts the feeble light (photons) 18 to the electrons 22 as shown in FIG. 2. The electrons 22, which have a kinetic momentum according to the intensity of the light incident on the photoelectric surface 16, are incident on the capillaries 14 constituting the MCP 12, are amplified in number about $10^4$ to about $10^{12}$ times according to the kinetic momentum of the incident electrons 22, and turn to electronic pulses to be incident on the anodes 32 of the electronic pulse reading chip 30.

In the electronic pulse reading chip 30, the operation switchover part 74 switches over the operations of the detection transistors 34 and the switch circuits 80 according to switching patterns based on the Hadamard matrix being a quadrature modulation pattern. The switching patterns (modulation modes) based on the Hadamard matrix are generated by the encoder for Hadamard logic generation in the operation switchover part 74 when the state number input terminals 98 connected to the operation switchover part 74 are selected.

Figure 5:
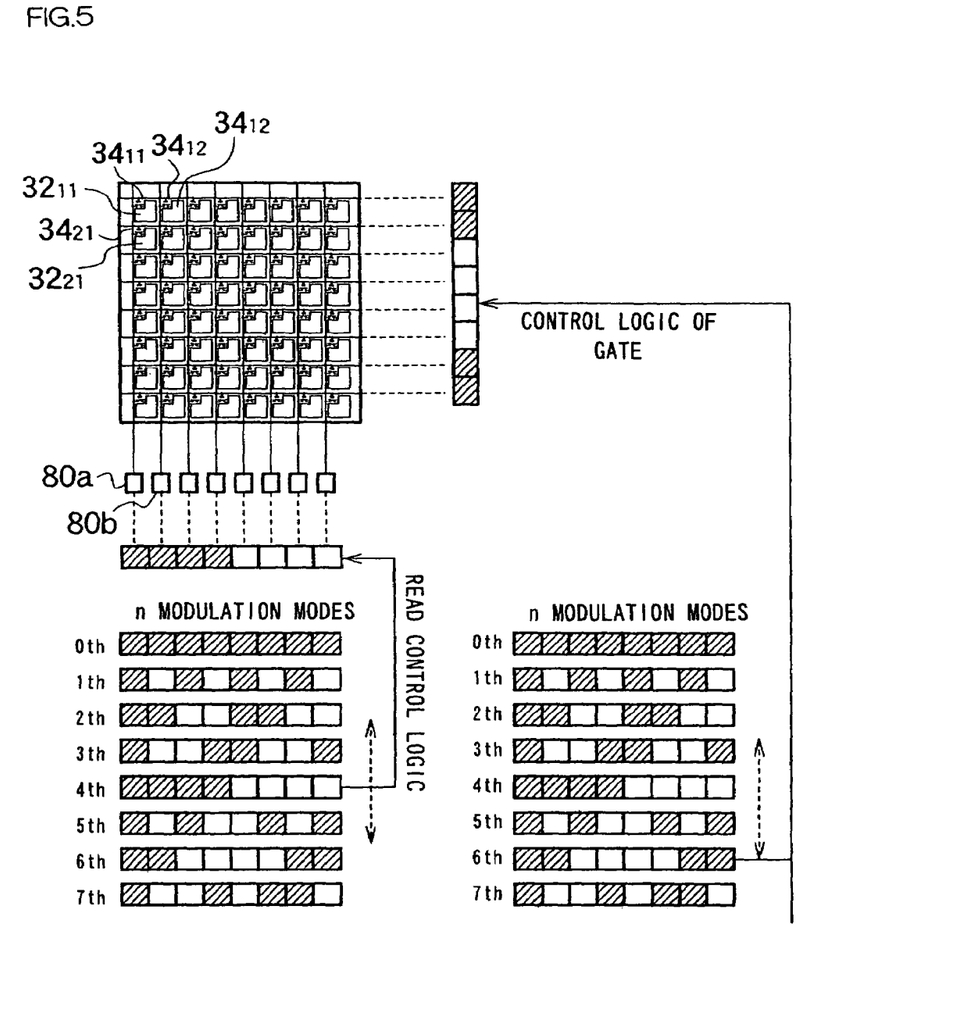
FIG. 5 is an explanatory view showing an example of an operating method of the electronic pulse detection chip according to the embodiment of the present invention.

For example, when the number of the detection transistors 34 is 8×8, the number of the state number input terminals 98 for operating the detection transistors 34 is 3 and the number of the state number input terminals 98 for switching over the switch circuits 80 is 3, and when they are selected, 8 different switching patterns for each as shown in FIG. 5 are generated. Then, the operation switchover part 74 generates 8 modulation modes shown in the lower part in FIG. 5 based on the Hadamard matrix, and it connects all the gate control lines 70 to a gate power source based on a 0th actuating signal (switchover signal) shown on the lower right side in FIG. 5 to apply gate voltages on the gates of all the detection transistors 34 via the buffers 72 and, at the same time, sequentially switches over the second gate control lines 88 based on 0th to 7th switchover signals shown on the lower left side in FIG. 5 to switch over the switch circuits 80 between ON and OFF in sequence via the buffers 96. In synchronization with the switchover of the gate control lines 70, 88, an enable signal is inputted to the enable input terminal to turn on the selected transistors.

When the 0th to 7th switchovers of the switch circuits 80 via the second gate control lines 88 are finished, a not-shown control device selects the state number input terminal 98 for generating the 1st switchover signal shown on the lower right in FIG. 5, and the operation switchover part 74 applies voltages on the gates of the detection transistors 34 connected to the gate control lines 70 of the first, third, fifth, and seventh rows, and in this state, the 0th to 7th switchovers of the switch circuits 80 are conducted. Thus, the operation switchover part 74 conducts the 0th to 7th switchovers of the switch circuits 80 each time it conducts the 0th to 7th switchovers of the voltages applied on the gates of the detection transistors 34. Consequently, the gate voltages are constantly applied on half of the detection transistors 34 and half of the switch circuits 80 are turned on, so that signals (current pulses) from one fourth of the entire detection transistors 34 pass though the current-voltage conversion resistance $R_L$.

Note that, in FIG. 5, the voltage level in the hatched portions for turning on the detection transistors 34 or the switch circuits 80 is "H" and corresponds to "1" of the Hadamard matrix. The voltage level in the outline portions is "L" for turning off the detection transistors 34 or the switch circuits 80, and corresponds to "−1" of the Hadamard matrix.

FIG. 6-A to FIG. 6-C are views to explain an electronic pulse detecting method in the electronic reading chip 30. FIG. 6-A shows a case where the gate voltage is applied on the gate of the detection transistor 34 via the gate control line 70 so that the detection transistor 34 is on, and the voltage level of the second gate control line 88 is "H" so that the switch circuit 80 is on.

In FIG. 6-A, since the second control line 88 is "H", "H" is inputted to the gate of the first transistor 82 of the switch circuit 80 to turn on this transistor 82. On the other hand, the second transistor 84 of the switch circuit 80 is turned off since the gate thereof is connected to the second gate control line 88 via the inverter 86 and accordingly, the gate voltage is "L". Therefore, when the electronic pulse is incident on the anode 32, a current flows through the current-voltage conversion resistance $R_L$ via the detection transistor 34 and the first transistor 82 of the switch circuit 80 as shown by the arrow 120 since the detection transistor 34 is on. This current is proportional to the intensity of the electronic pulse (the magnitude of the number of electrons) incident on the anode 32, and converted to a voltage pulse by the current-voltage conversion resistance $R_L$ according to a current amount. This voltage pulse is amplified by the operational amplifier 90 to be inputted to the pulse height distribution processing circuit 110.

FIG. 6-B shows a case where the detection transistor 34 is off. In this case, even when the electron pulse is incident on the anode 32, no current flows through the detection transistor 34 since the detection transistor 34 is off, and even when the switch circuit 80 is on (the transistor 82 is on), no current flows through the current-voltage conversion resistance $R_L$. Therefore, no voltage pulse is inputted to the operational amplifier 90.

FIG. 6-C shows a case where the detection transistor 34 is on and the switch circuit 80 is off. Specifically, the voltage of the second gate control line 88 is at "L" level, the first transistor 82 of the switch circuit 80 is off, and the second transistor 84 thereof is on. Therefore, when the electronic pulse is incident on the anode 32 to cause a current to flow through the detection transistor 34, the second transistor 84 of the switch circuit 80, when turned on, leads the current from the detection transistor 34 to the ground as shown by the arrow 122 since the gate thereof is grounded. Accordingly, no current flows through the current-voltage conversion resistance $R_L$. Moreover, when the switch circuit 80 is off, in other words, when the second transistor 84 is on, it is possible to completely prevent the flow of the current through the current-voltage conversion resistance $R_L$, since the drain of this transistor 84 is grounded, which makes it possible to enhance detection precision of the electronic pulse.

Figure 7:
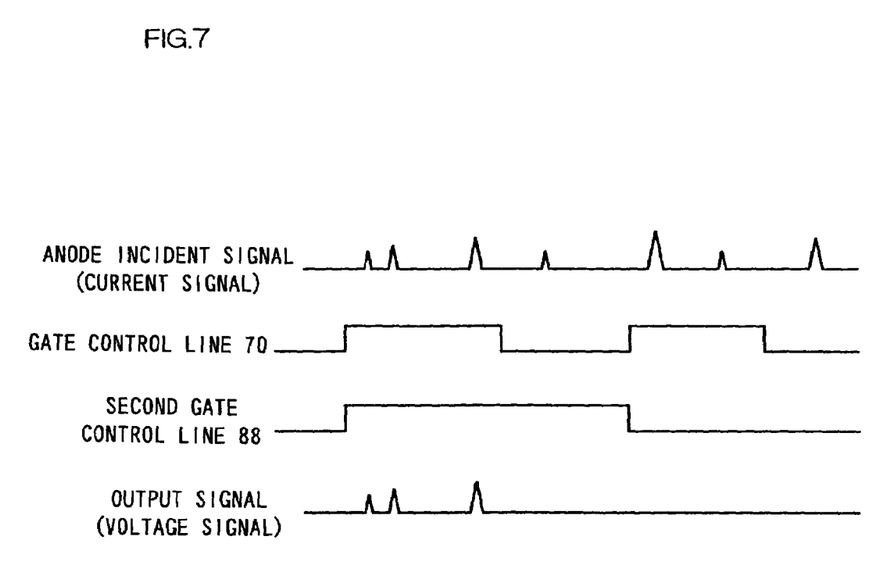
FIG. 7 is a timing chart explaining a pulse detection operation by the electronic pulse detection device according to the embodiment of the present invention.

Therefore, even when the electronic pulse is incident on the anode 32, an output signal (voltage pulse) appears on an output side of the operational amplifier 90 being an amplifying part only when the gate control line 70 and the second gate control line 88 are both "H" as shown in FIG. 7. When one of or both of the gate control line 70 and the second gate control line 88 is(are) "L", no current flows through the current-voltage conversion resistance $R_L$, so that no output signal appears on the output side of the operational amplifier 90.

Figure 8:
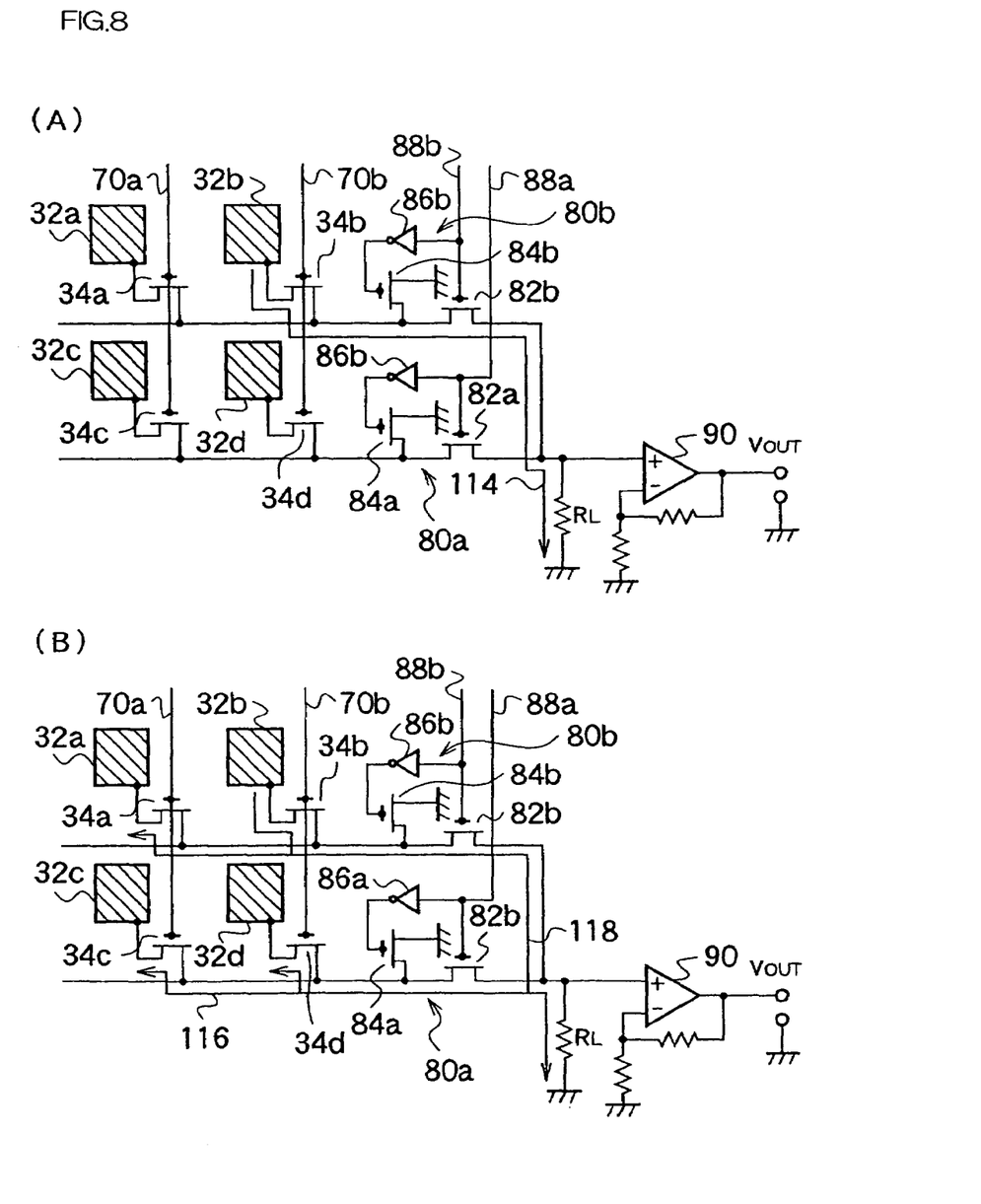

FIG. 8-A to FIG. 8-B are views to explain pulse addition in the electronic pulse reading chip 30 in the embodiment. Note that the pulse addition in the present invention signifies that an electronic pulse can be detected as a voltage signal any time regardless of on which one of the anode $32_{ij}$ of the electronic pulse reading chip 30 the electronic pulse is incident. Both of FIG. 8-A to FIG. 8-B show cases where the detection transistors 34 (34a to 34d) are on, the first transistors 82 (82a, 82b) of the switch circuits 80 (80a, 80b) are on, and the second transistors 84 (84a, 84b) of the switch circuits 80 are off.

FIG. 8-A shows a case where an electronic pulse is incident on the anode 32b, and at this time, a current flows through the current-voltage conversion resistance $R_L$ via the detection transistor 34b and the first transistor 82b of the switch circuit 80b as shown by the arrow 114, so that a pulse is outputted from the operational amplifier 90. FIG. 8-B shows a state in which a resistance value of the current-voltage conversion resistance $R_L$ is high and a current due to an electronic pulse incident on the anode 32b is reflected to the side of the detection transistors 34a, 34c, 34d by the current-voltage conversion resistance $R_L$.

Further, in the embodiment, since extremely feeble light is detected, it is premised that the frequency of the photons (the light 18) reaching the electronic pulse detection device 10 is low, and the electronic pulses are not incident on all the anodes 32 simultaneously. Specifically, since the electronic pulse incident on each of the anodes 32 has a pulse width of about 400 picoseconds and is an electronic pulse by feeble light, the probability of the electronic pulses being incident on the plural anodes 32 simultaneously is low, and therefore, it is possible to obtain a voltage pulse corresponding to each of the electronic pulses incident on the anodes 32.

The voltage pulses outputted by the operational amplifier 90 are counted in the pulse height distribution processing circuit 110. Then, coefficient values classified by the pulse height outputted by the pulse height distribution processing circuit 110 are sent to an image generating device constituted of a computer and execute inverse Hadamard transformation to be transformed to a two-dimensional image.

Thus, in the embodiment, the detection transistors 34 arranged in matrix are so configured that those on the same row are connected to one another and those on the same column are connected to one another, and they are driven for signal reading based on the Hadamard matrix being the quadrature modulation pattern, and therefore, it is possible to read electronic pulses incident on the anodes 32 at high speed even when the number of the capillaries 14 of the MCP 12 is very large, which makes it possible to obtain a two-dimensional image originating from extremely feeble light.

Note that, when a feeble radiation such as a scattered X-ray or a gamma ray is detected, the radiation is made incident on a scintillator to be converted to light and this light is made incident on the photoelectric surface 16 of the electronic pulse detection device 10.

The above-described embodiment is explained as one form of the present invention and the present invention is not limited to this embodiment. For example, in the above-described embodiment, the case where the detection transistors 34 on the same row are operated as a unit is explained, but such a configuration may be adopted that the gates of the detection transistors 34 on the same column are connected to one another to be turned on/off as a unit and the detection transistors 34 on the same row are connected to the switch circuit 80 as a unit. Further, an A/D converting circuit may be provided in the electronic pulse reading chip 30, thereby converting the output of the operational amplifier 90 to a digital signal to output it as the digital signal.

As explained hitherto, according to the present invention, in operating the switch parts arranged in matrix, those on the same row or column are operated as a unit, based on, for example, the quadrature modulation patterns, so that it is possible to simultaneously convert the electronic pulses incident on the plural electrode parts to voltages to read them, and by the demodulation thereof, a two-dimensional image is easily obtainable. The quadrature modulation patterns may be patterns based on the Hadamard matrix.

Further, the electronic pulse detection chip according to the present invention can be formed easily by the VLSI manufacturing technology, and enables downsizing and a high-speed operation of the electronic pulse detection device.

INDUSTRIAL APPLICABILITY

The present invention can be utilized in a device for detecting a two-dimensional electronic pulse that is obtained by photoelectrically converting extremely feeble light, and particularly, can be utilized in a device for detecting feeble light that utilizes a microchannel plate that detects feeble light two dimensionally.

What is claimed is:

1. An electronic pulse detection device comprising:
   a plurality of electron amplifying parts arranged in matrix and configured to increase the number of incident electrons;
   electrode parts which are provided to correspond to said respective plural electron amplifying parts and on which the electrons from said electron amplifying parts are incident;
   a plurality of switch parts provided to correspond to said respective electrode parts, the switch parts on a same row and on a same column being connected to one another, and the mutually connected switch parts on the same row or on the same column being turned on/off as a unit;
   a current-voltage converting part to which said switch parts are connected and which is configured to convert a current due to the electrons incident on said electrode parts to a voltage when the switch parts are turned on; and
   a plurality of switch circuit parts each provided to correspond to each row or each column of said switch parts connected to one another, and each configured, when turned on, to connect said switch parts of the same row or the same column to said current-voltage converting part as a unit and when turned off, to ground said switch parts of the same row or the same column as a unit; and
   an operation switchover part connected to said switch parts and said plural switch circuits and configured to turn on/off said switch parts on the same row or the same column that are turned on/off simultaneously and said switch circuits based on a quadrature modulation pattern.

2. An electronic pulse detection device according to claim 1, wherein said operation switchover part switches over operations of the switch parts and the switch circuit parts according to a switching pattern based on a Hadamard matrix that is the quadrature modulation pattern.

3. An electronic pulse detection chip comprising:
   a plurality of detection electrodes which are arranged in matrix on an upper face and on which electronic pulses are incident;
   a plurality of field effect transistors provided under said detection electrodes via an insulation layer so as to correspond to said respective detection electrodes;
   conductive parts electrically connecting drains or sources of the field effect transistors to said detection electrodes;
   gate control lines each connecting gates of said field effect transistors on a same row or on a same column to one another;
   signal reading lines each connecting sources or drains, to which said detection electrodes are not connected, of the field effect transistors on the same row or the same column to one another;
   switch circuits provided to correspond to said respective signal reading lines; and
   a current-voltage conversion circuit to which said signal reading lines are connected in parallel via said switch circuits; and
   an operation switchover part connected to said field effect transistors and said plural switch circuits and configured to turn on/off said field effect transistors on the same row or the same column that are turned on/off simultaneously and said switch circuits based on a quadrature modulation pattern.

* * * * *